(12) United States Patent
Valdmaa et al.

(10) Patent No.: US 9,566,736 B2
(45) Date of Patent: Feb. 14, 2017

(54) SYSTEM AND METHOD FOR PRODUCING PLASTIC PRODUCTS FROM RECYCLED MIXED PLASTIC WASTE AND PLASTIC PRODUCT

(71) Applicant: Rexest Grupp OÜ, Mäo Center, Järva County (EE)

(72) Inventors: Andrus Valdmaa, Ülenurme Parish (EE); Aivo Käsnar, Tartu (EE); Aarne Saareväli, Tallinn (EE)

(73) Assignee: Rolan Investment OU, Tallin (EE)

(*) Notice: Subject to any disclaimer, the term of this patent is extended or adjusted under 35 U.S.C. 154(b) by 45 days.

(21) Appl. No.: 14/299,593

(22) Filed: Jun. 9, 2014

(65) Prior Publication Data

US 2015/0306804 A1    Oct. 29, 2015

(30) Foreign Application Priority Data

Apr. 25, 2014 (EP) .................................. 14166067

(51) Int. Cl.
    *B29C 47/10*    (2006.01)
    *B29C 47/38*    (2006.01)
    (Continued)

(52) U.S. Cl.
    CPC ....... *B29C 47/0004* (2013.01); *B29B 17/0026* (2013.01); *B29B 17/0042* (2013.01); *B29C 31/06* (2013.01); *B29C 47/0042* (2013.01); *B29C 47/065* (2013.01); *B29C 47/60* (2013.01); *B29C 47/6087* (2013.01); *B29C 47/827* (2013.01); *B29C 47/862* (2013.01); *B29C 47/864* (2013.01); *B29C 47/866* (2013.01); *B29C 47/868* (2013.01); *B29C 47/8815* (2013.01); *B29C 47/8895* (2013.01); *B29C 47/90* (2013.01); *B29C 47/904* (2013.01); *B29C 47/92* (2013.01); *C08J 9/0061* (2013.01); *B29C 47/0066* (2013.01); *B29C 47/34* (2013.01); *B29C 47/86* (2013.01); *B29C 2793/009* (2013.01); *B29C 2947/9258* (2013.01);
    (Continued)

(58) Field of Classification Search
    CPC ............. B29C 47/0004; B29C 47/0042; B29C 47/0066; B29C 47/06; B29C 47/065; B29C 47/34; B29C 47/60; B29C 47/6087; B29C 47/827; B29C 47/86; B29C 47/862; B29C 47/864; B29C 47/866; B29C 47/868; B29C 47/8815; B29C 47/8895; B29C 47/90; B29C 47/904; B29C 47/92
    See application file for complete search history.

(56) References Cited

U.S. PATENT DOCUMENTS 4,732,718 A * 3/1988 Jentet ...................... B29C 47/90
                                                     264/237
4,749,531 A * 6/1988 Borger .................... B29C 47/90
                                                     264/40.6

(Continued)

*Primary Examiner* — Alison L Hindenlang
*Assistant Examiner* — Joseph Leyson
(74) *Attorney, Agent, or Firm* — Berggren, Inc.

(57) ABSTRACT

System and method for producing plastic products from a recycled plastic mix of unidentified, unclean and unsorted mixed plastic waste comprises the thermal and mechanical processing of the recycled plastic waste using continuous extrusion foaming, two-phase cooling, continuous metering of the pulling strength and automatic adjustment of the pulling speed and extrusion speed.

15 Claims, 6 Drawing Sheets

(51) Int. Cl.

| | | |
|---|---|---|
| *B29C 47/86* | (2006.01) | |
| *B29C 47/90* | (2006.01) | |
| *B29C 47/00* | (2006.01) | |
| *B29C 47/88* | (2006.01) | |
| *B29C 47/06* | (2006.01) | |
| *B29C 31/06* | (2006.01) | |
| *C08J 9/00* | (2006.01) | |
| *B29C 47/60* | (2006.01) | |
| *B29B 17/00* | (2006.01) | |
| *B29C 47/92* | (2006.01) | |
| *B29C 47/82* | (2006.01) | |
| *B29K 101/12* | (2006.01) | |
| *B29K 105/00* | (2006.01) | |
| *B29K 105/26* | (2006.01) | |
| *B29C 47/34* | (2006.01) | |

(52) U.S. Cl.
CPC ............ *B29C 2947/92085* (2013.01); *B29C 2947/92438* (2013.01); *B29C 2947/92857* (2013.01); *B29K 2101/12* (2013.01); *B29K 2105/0005* (2013.01); *B29K 2105/0032* (2013.01); *B29K 2105/0044* (2013.01); *B29K 2105/26* (2013.01); *C08J 2323/16* (2013.01); *C08J 2423/12* (2013.01); *C08J 2425/06* (2013.01); *Y02W 30/62* (2015.05)

(56) References Cited

U.S. PATENT DOCUMENTS

| | | | | |
|---|---|---|---|---|
| 5,108,676 | A * | 4/1992 | Hayashi | B29C 47/0004 264/108 |
| 5,198,171 | A * | 3/1993 | Kasahara | B01F 13/1027 264/142 |
| 5,474,722 | A * | 12/1995 | Woodhams | B29C 47/0004 264/108 |
| 5,626,807 | A * | 5/1997 | O'Halloran | B29C 47/003 264/148 |
| 2002/0125600 | A1 | 9/2002 | Horne | |
| 2005/0051646 | A1 | 3/2005 | Horne | |
| 2008/0118593 | A1* | 5/2008 | Gruber | B29C 47/0822 425/72.1 |
| 2010/0035064 | A1* | 2/2010 | Nam | B29C 47/8805 428/409 |

* cited by examiner

SYSTEM AND METHOD FOR PRODUCING PLASTIC PRODUCTS FROM RECYCLED MIXED PLASTIC WASTE AND PLASTIC PRODUCT

PRIORITY

This application claims priority of EP 14166067, filed on Apr. 25, 2014 the content of which is fully incorporated herein by reference.

FIELD OF THE INVENTION

The present solution belongs in the field of recovery of plastic waste, more specifically in the field of recycling unsorted, unidentified and unclean mixed plastic waste and producing finished products of the recycled material.

BACKGROUND OF THE INVENTION

Plastic packaging (e.g. plastic bags, plastic packaging of ham, cheese, yoghurt, other foods and consumer products, and plastic utensils) and other plastic waste (bottle crates, garden furniture, buckets, plastic sledges, car bumpers, petrol cans, pipes, spools, computer shells, TV shells, plastic parts of fridges, etc.) are the most problematic and the fastest-growing type of waste. According to common solutions, this type of waste is primarily landfilled, burned or used as filler. These solutions pollute the environment, are expensive and waste material that could be used as a raw material for new products.

Aside from that, everyone knows about plastic-waste recycling solutions where the waste is first sorted, then cleaned, and plastics of the same type are recycled into a uniform mass, granules or new products. The process of recycling is type-based, which means that, for example, LDPE (plastic packaging and bags), HDPE (plastic bags and thick-walled plastic products) or PET (plastic bottles of beverages) waste is washed, ground, dried and granulated. The plastics industry can use plastic granules made of one polymer as raw material for making new products. As sorting plastic waste by type is very expensive and time-consuming, mixed plastic waste that is not easy to sort is usually not recycled; it is either incinerated or landfilled.

There is no suitable solution for recycling polymers of different types. Compared to other materials, such as glass or metals, plastic polymers need to be processed longer to be recycled. The biggest problem is that polymers of different types do not mix because their molecular weight differs and they have long polymer chains. Heating polymers is not enough to break down their molecules. So, to be recycled, polymers need to be identical to achieve effective mixing. If different types of plastic are melted together, they do not mix, like oil and water—they form layers.

Such problems prevent the plastics industry from using unsorted mixed plastic waste, and sorting household and other plastic waste by types is very costly and almost impossible. The standard plastics industry that puts hundreds of millions of tonnes of plastic products on the market is set up to use 'virgin' or primary single-type plastic granules (LDPE, HDPE, PS, PP, PET, AB, composites (PS/PP, PP/PE, PS/PC) HIPS, EPS, PA, POM, PC, etc.), and its technological production solutions are not able to handle mixed or unclean plastic waste.

The mixing and melting of different types of plastic results in a very unstable mass that is difficult to handle in a common plastics manufacturing process in order to achieve a stable process and product. To mix different types of plastic waste in reprocessing, other materials are added to the mixture.

There are non-state-of-the-art solutions for making different products from recycled mixed plastic waste. Such solutions require other materials, chemical elements or pure, identifiable and cleaned plastic granules (virgin polymers) to be added to the recycled plastic mix in order to ensure better binding of the mixture. The materials used as fillers or additives are, for example, metal, wood, oil, talc, fly ash, potash, wood flour, or wood pulp. For example, a wood and polymer mixture is used to make WPC profiles, using the extrusion method. The weakness of such products is that the additives make these less weatherproof, and they are difficult to be nailed, milled or processed in any other way.

There are various state-of-the-art solutions for recycling mixed plastic waste into raw material for various products: for example, processing and compacting plastic waste by agglomerating, processing by extrusion or using the injection moulding technology. The extrusion process makes use of either single-screw extruders or multi-screw extruders (twin-, triple- or more screw extruders).

A common polymer extrusion process handles polymeric raw material that is exactly identified and has the very clear characteristics of a certain type of polymers. Such solutions do not allow for low-cost and fast recycling of mixed plastic waste, because the waste needs to be sorted, cleaned and dried beforehand, and the different types of plastic waste need to be processed separately.

The solution that is the most similar to the present invention is the manufacturing of products from raw material that has been recycled from mixed plastic waste, using a single-screw extruder. Examples of such a solution are patent applications US20050051646A1 (Collex Pty. Ltd.), Oct. 3, 2005 and US20020125600A1 (David Horne), Dec. 9, 2002, that describe the recycling of mixed plastic waste to produce products, such as vineyard posts, oyster posts, pipe supports, slats, spat trays, manhole covers, and railroad ties, by moulding. The shortcoming of the said solution is that end products from recycled plastic waste cannot be made using a continuous process; instead, moulds need to be attached to the extruder. This makes production time-consuming, complex and costly.

SUMMARY OF THE INVENTION

A system for producing plastic products from recycled mixed plastic waste is provided comprising a system for mixing raw materials, a first conveyor, a hopper, a second conveyor, a fine mixer with a weighing system, a control panel, an extruder, a system of calibration matrices on a calibration table, a water-cooling bath, a pultrusion machine with a converter and an electric motor with a reducer, and an automatic cutter, wherein:

the extruder comprises a motor; a gearbox; a frame; cooling ventilators; a screw that has a feeding zone, a compression zone, and a mixing zone; a barrel that includes multiple heating zones; an extrusion head; a die; and a head extension that is also used as the first cooling zone;

the system of calibration matrices comprising a first calibration matrix that is connected to the extrusion head extension; a second calibration matrix, third calibration matrix, a forth calibration matrix, each of them comprising a bottom, a lid and two sides and that are rigidly fixed to one another, thus forming an inner chamber of the matrices; and cooling channels;

the pultrusion machine constantly measuring pulling strength and pulling speed and adjusting extrusion speed automatically.

Provided also is a method for producing plastic products from recycled mixed plastic waste, using the system where the method comprises the following steps:

a mixture of raw material is made of recycled mixed plastic waste;

additives are added; the mixture is mixed; the mixture is extruded;

it is cooled down;

the pultrusion process is performed; the plastic products are automatically cut to size, wherein:

after mixing the raw materials, the first conveyor takes the mixed plastic waste to the hopper, and the second conveyor takes these to the fine mixer with the weighing system;

in the fine mixer, additives either recycled mixed plastic waste and/or granulated plastic waste of one type are added to the mixture;

from the fine mixer, the mixed and grinded mixture of mixed plastic waste and additives go to the extruder, where continuous extrusion foaming takes place in compliance with the temperature curve, the temperature being controlled in the zones of the extruder;

after the extrusion process, the plastic mass made from the mechanically and thermally processed mixed plastic waste and additives goes to the system of calibration matrices that is connected to the extruder;

this is followed by a two-phase cooling in the system of calibration matrices and the water cooling bath;

after cooling, the material goes to the pultrusion machine that constantly measures pulling strength and pulling speed and automatically adjusts the extrusion speed, and then to the automatic saw that cuts the products to size.

Also a plastic product obtained by the system and the method is provided where the product comprises unidentified, unsorted, unclean material recycled from mixed plastic waste, wherein the plastic product has a top-surface structure, a bottom-surface structure, side-surface structures and, a surface layer, a surface, and an inner part; the composition comprises approximately 5-15% polystyrene and polypropylene and 70-90% PE/PP; and the properties of which are the following:

density: 0.6-0.8 t/m$^3$;

a dense surface layer of 5-20 mm and porous and foamed insides;

flexural properties: 1843 N/mm$^2$ at −50° C.; 795 N/mm$^2$ at 22° C.; and 452 N/mm$^2$ at 60° C.;

linear expansion: 0.069 mm/m/° C. (indicates product expansion per 1 m when the temperature rises by 1 degree Celsius);

flammability class: E;

UV-impairment: ΔE=1.1 (the UV tests were carried out under standard conditions (ASTM G154) over a period of time correlating to approximately 10 years of natural sunlight. ΔE indicates the change in colour-coordinates (L, a, b))

water absorption: 0.17% sound isolation: B3 resistance to with no damage from white spirits, lighter fluid, bleach or hot baking oil non-toxic resistant to temperature fluctuation in the range between +65° C. and −30° C.;

linear expansion coefficient: 0.083-0.099α, mm/m·° C.;

surface hardness of the product is 4H-5H.

load: 166-222 N;

holding strength: 1328-1776 N;

compressive force: 34.1-43.6 kN.

The aim of the present invention is to propose a solution that has none of the abovementioned shortcomings of the prior art to easily, quickly and at a low cost make end products from unsorted, unidentified and unclean mixed plastic waste that has been recycled. The aim of the invention is achieved by the solution where unsorted, unidentified and unclean plastic waste of varying volume weight (e.g. polypropylene, HD-polyethylene, LD-polyethylene, polystyrene, ABS, PET and other unidentified plastic wastes that contain plastics of different colour) is recycled into a material mix that is used to produce final products in a continuous extrusion process.

According to the present solution for producing products from raw material that has been recycled from mixed plastic waste, a stable continuous extrusion process is used to handle various polymeric mixtures (including unidentified recovered polymeric materials), the final products complying with the requirements stipulated for them.

In the continuous extrusion process, the mixture resulting from the recycling of mixed plastic waste is made into plastic products; for example, profile boards that are used for making port structures, terrace systems, noise barrier systems, garden systems, furniture and finishing materials for buildings.

The advantage of the present solution, compared to other known solutions, is that to counterbalance the new plastic products put on the market, plastic waste is recycled without the need to sort different types of polymers. The final products made of the raw material mixture that is the result of recycling of unidentified mixed plastic waste are weatherproof, maintenance free and fully recyclable after decades of use, thus providing a new endless use cycle for plastic waste. The profiles produced using the continuous extrusion method according to the present invention can be widely used; certified product groups can be made on the basis of these (e.g. noise barriers, terrace systems and other construction systems); the process spares trees, as this material is more weatherproof and a maintenance-free alternative to wood; the process also contributes to nature protection by recovering plastic waste. The products made using the present method can be milled, sawed, nailed and otherwise processed.

The solution according to the present invention comprises the separation of metals and non-ferrous metals, making a mixture of mixed plastic waste of high and low volume weight that has been previously recycled, adding additives, mixing, continuous extrusion foaming, two-phase cooling with a system of special matrices and water cooling, a controlled pultrusion process, and cutting of profiles.

Plastics of low volume weight (0.1-0.15 (up to 0.4) t/m$^3$) are mainly, for example, highly volitant plastic packaging from households, such as plastic bags and packages for ham, cheese, yoghurt, other foods and consumer products. These packages are the most problematic and constantly growing type of plastic waste that is currently only either landfilled or incinerated. Statistically, this low volume weight group of plastics includes on average: PE (50-60% of the volume), PP (20-30% of the volume), PS (5-10% of the volume) and other unidentified plastics (e.g. PA, PET, POM, PC, composite plastics; 1-10% of the volume).

High volume weight (>0.4 t/m$^3$) plastics are household or industrial plastic waste that needs to be scrapped, for example, bottle crates, garden furniture, buckets, plastic sledges, car bumpers, petrol cans, pipes, spools, computer shells, TV shells and plastic parts of fridges. Statistically, this group includes, for example: PS, PP, PE (LDPE and HDPE), HIPS, ABS, PC, PS/PP (compounds), PP/HD (compounds), MIX Plast (plastics of unidentified type).

According to the solution of the present invention, plastic products are made from, for example, the following unidentified, unclean, unsorted and previously ground and/or agglomerated or otherwise compacted mixed plastic waste from landfills, places that buy up plastics, etc.:
1. polyethylene terephthalate or PET—for example, carbonated beverage and cooking oil bottles; water, ketchup and salad dressing bottles; and waterproof packaging;
2. high-density polyethylene or HDPE—for example, non-carbonated beverage, cooking oil and juice bottles; household chemicals; bottle caps; and plastic bags;
3. polyvinylchloride or PVC—for example, food trays and bottles of household chemicals;
4. low-density polyethylene or LDPE—for example, packaging film, plastic bags, trash bags and soft bottles;
5. polypropylene or PP—for example margarine boxes, packaging film and bottle caps;
6. polystyrene or PS—for example, fast food packaging, medicine jars and protective covers;
7. other plastics—for example, multi-layered and multi-plastic packages, items made of special plastic, PE products (trash bags and plastic buckets).

In addition, for example, households have lots of other plastic items that are not packaging and that are not collected as part of a well-established collection system; these are toys, fleece, drainage and sewer pipes, shells of household appliances, utensils, and thermal insulation material. The sector of construction and special plastics is developing fast, and these also are labelled; for example, EPS stands for expanded polystyrene (hard foamed plastic) that is used for thermal insulation, helmets, medical supplies and electrical equipment; ABS, acrylonitrile butadiene styrene that is used for making mobile phone cases and car parts; PA, polyamide (nylon); PUR (also PU), polyurethane; EPUR, expanded polyurethane that is used for making mattresses, car seats and pillows; PTFE, polytetrafluoroethylene; PMMA, polymethylmethacrylate; and PC, polycarbonate. Beverage packaging is often made of composite materials that are a mixture of cardboard, polyethylene (15-20%) and aluminium (5%).

To stabilise the production process, the devised temperature curves and pressures caused by extrusion in product matrices are monitored and controlled. The screw of the extruder ensures controlled mixing and behaviour of raw material in the feeding, compression and metering phases. The pitch and depth of the screw thread is designed for processing the raw material for this invention in order to achieve a stable extrusion process. The surface of the screw withstands the highest abrasiveness of the raw material.

In contrast with the known solutions, the calibration matrices are divided into several parts. This ensures a stable extrusion process that can be controlled and directed.

To make the production process stable, the final part 29.3 of the extrusion head, the die 30 attached to it and the extension of the extrusion head or the first phase of cooling 31 are built as a single module.

The problems associated with mixing different types of polymers include different melt flow rates and different behaviour in the extrusion, moulding and cooling process. Mixing is a physicochemical process that is affected by both macromolecular interactions as well as factors of the mechanical mixing of the polymer mass. It is known that two similar substances dissolve in/mix with each other. If the polarity of polymers differs to some extent, their mixing depends on the difference of their polarity. Depending on the ratio, the capability to mix may be reduced, but they retain their capacity to emulsify. Thus, the composition, recipe or ratio of the polymers is what is important. For example, it is well-known that water and mineral oil or fat do not mix; nevertheless, emulsions and creams where oil and fats are mixed with water are also well-known. Thus, the process of polymer mixing is also to an extent colloid-chemical. The result is achieved when the substances are mixed at an optimal intensity. With the recipe and mixing method in the extruder and with temperature control according to the present invention, the raw polymeric material is mixed at a specific ratio and fixed when the plastic cools down.

BRIEF DESCRIPTION OF THE DRAWINGS

The present invention is explained more precisely with references to figures added, where.

DETAILED DESCRIPTION OF THE INVENTION

Figure 1:
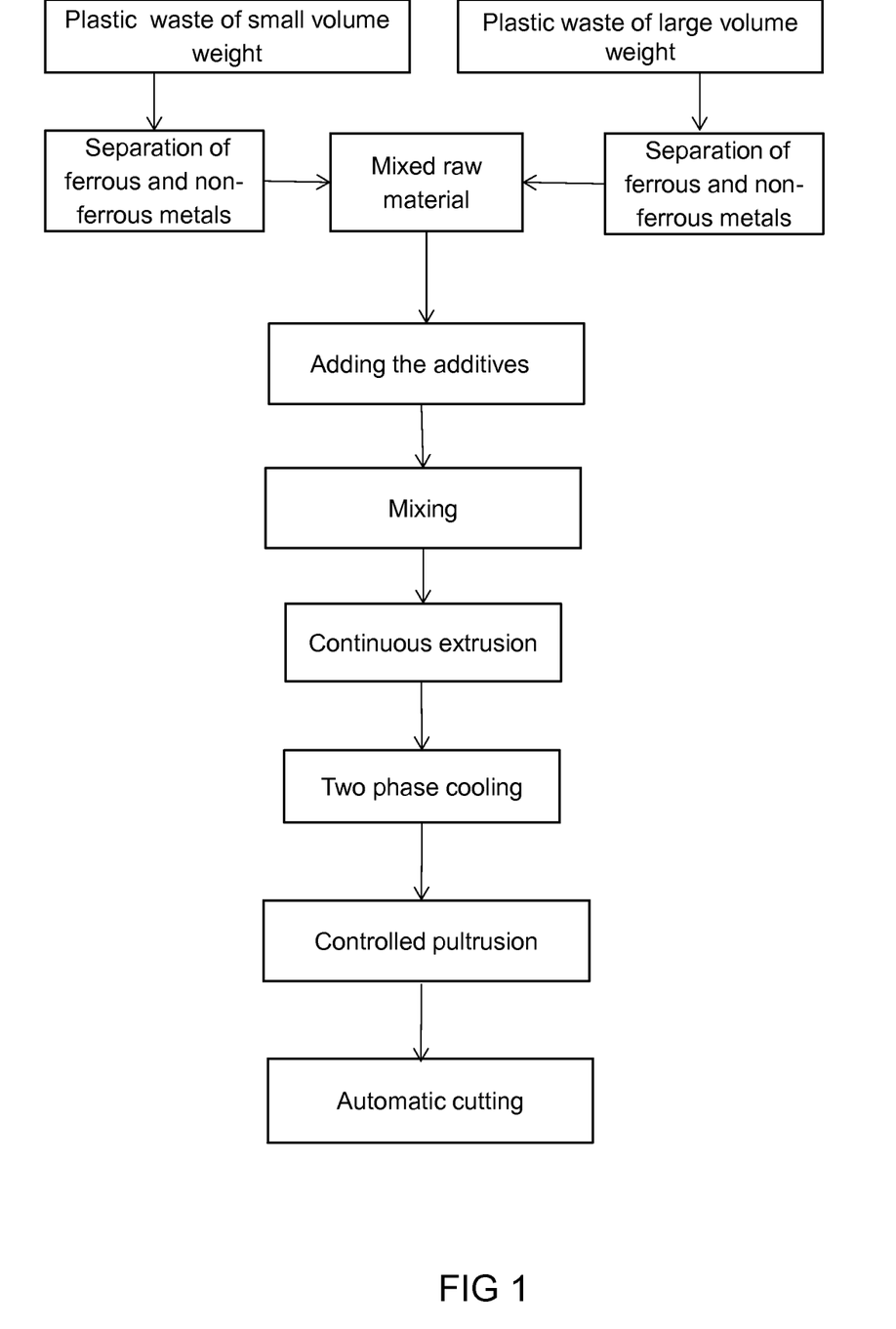
FIG. 1 is a block diagram of the method for producing finished products from a mix of materials recycled from mixed plastic waste, according to the present invention.
Figure 6:
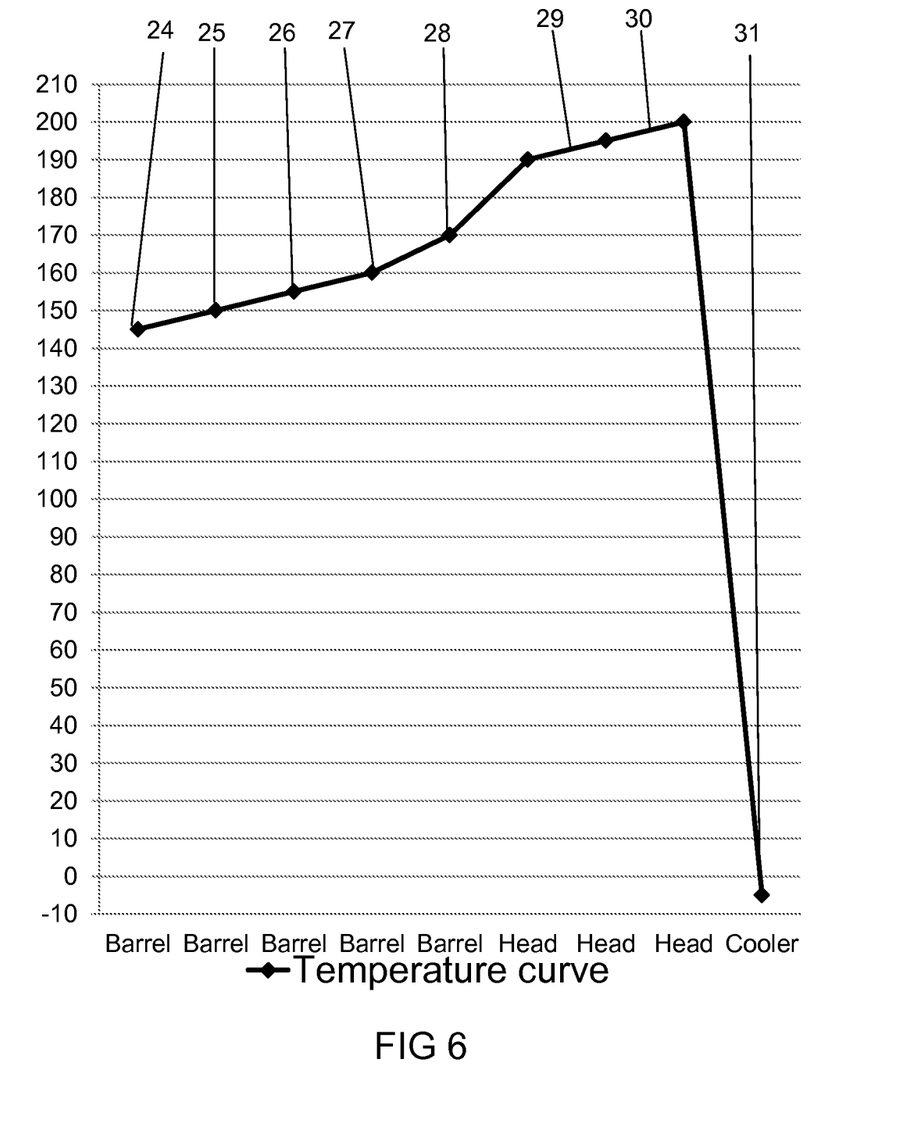
FIG. 6 depicts the temperature curve of the extrusion process.

FIG. 1 depicts the method for producing plastic products from the raw material received as a result of recycling mixed plastic waste, according to the present invention, comprises separation of metals from the raw material recycled from mixed plastic waste, mixing of the raw material mix, adding additives, mixing, continuous extrusion foaming in compliance with the temperature curve according to FIG. 6, the temperature being controlled in extruder zones 24-31, two-phase cooling in the calibration matrices, making a product using the controlled pultrusion method, and the automatic cutting of the product.

Figure 2:
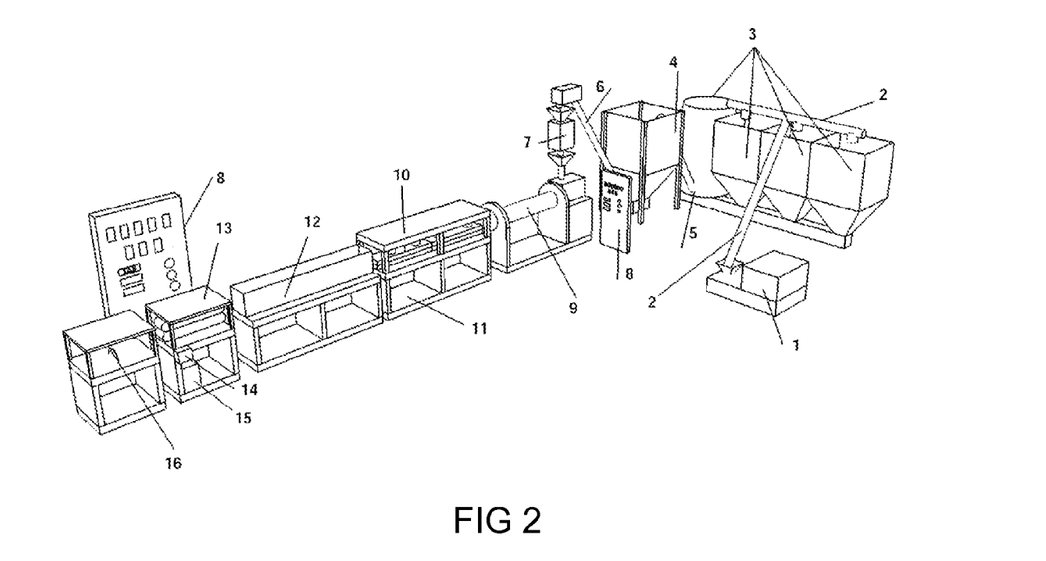
FIG. 2 is a diagram of the system for producing finished products from a mix of materials recycled from mixed plastic waste, according to the present invention.
Figure 3:
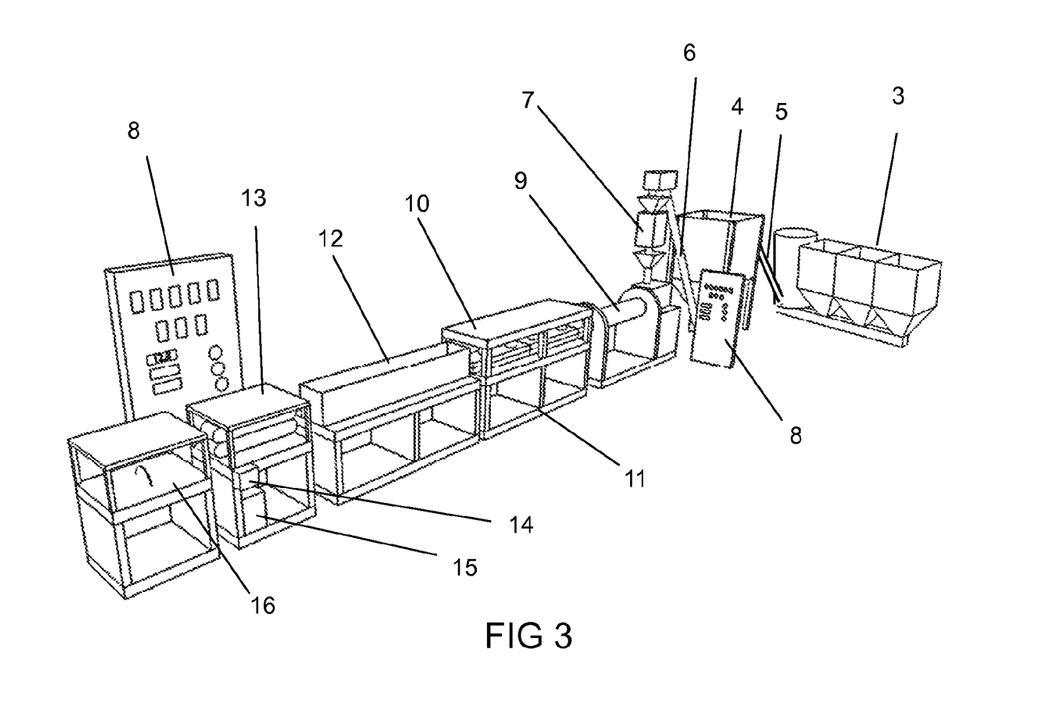
FIG. 3 is a diagram of an alternative system for producing finished products from a mix of materials recycled from mixed plastic waste, according to the present invention.

FIGS. 2 and 3 show the general diagram of the system according to the present invention for applying the method depicted in FIG. 1.

The invented system for producing plastic products from recycled mixed plastic waste comprises a system for mixing raw materials 3, a conveyor 5, a hopper 4 a conveyor 6, a fine mixer with a weighing system (e.g. electronic scales) 7, a control panel 8, an extruder 9, a system of calibration matrices 10 on the calibration table 11, a water-cooling bath 12, a pultrusion machine 13 with a converter 14 and an electric motor with a reducer 15, and an automatic cutter of the products 16. The alternative embodiment of the invention comprises a metal separator 1 with a conveyor 2 to the mixing system 3.

According to the invented system and method in FIG. 2, the metal separator 1 removes magnetic and non-magnetic metals from the previously recycled mixed plastic waste; then, the conveyor 2 takes the mixed plastic waste from the metal separator 1 to the mixing system 3; after mixing the raw materials, another conveyor 5 takes the mixed plastic waste to the hopper 4; and conveyor 6 takes these to the fine mixer with a weighing system (e.g. an electronic scales) 7, where additives (either recycled mixed plastic waste and/or granulated plastic waste of one type) are added to the mixture of previously recycled mixed plastic waste of high and low volume weight to make the mixture suitable for making the products; the control panel 8 is used to control the process and speeds; the fine mixer 7 is connected to the extruder 9 to which the mixed and ground mixture of mixed plastic waste and additives is taken for the extrusion process; after the extrusion process, the plastic waste made from the mechanically and thermally processed mixture of mixed plastic waste and additives goes to the system of calibration matrices 10 that is on the calibration table 11 connected to the extruder 9; from the matrix system 10, the material processed goes into the water cooling bath 12 and then to the pultrusion machine 13 with a converter 14 and an electric motor with a reducer 15, and finally to the saw 16 where the products are cut.

In the alternative embodiment in FIG. 3, the raw material, i.e. recycled mixed plastic waste of high and low volume weight, is taken directly to the mixing system 3; the conveyor 5 takes the mixture to the hopper 4; and conveyor 6 takes it to the fine mixer with the weighing system (e.g. an electronic scales) 7, where additives (either recycled mixed plastic waste and/or granulated plastic waste of one type) are added to make the mixture suitable for making the products; the control panel 8 is used to control the process and speeds; the fine mixer 7 is connected to the extruder 9 to which the mixed and ground mixture of mixed plastic waste and additives is taken for the extrusion process; after the extrusion process, the plastic waste made from the mechanically and thermally processed mixture of mixed plastic waste and additives goes to the system of calibration matrices 10 that is on the calibration table 11 connected to the extruder 9; from the matrix system 10, the material processed goes into the water cooling bath 12 and then to the pultrusion machine 13 with a converter 14 and an electric motor with a reducer 15, and finally to the saw 16 where the products are cut to size.

When the raw material is mixed, the resulting mixture comprises approximately 50%-75% raw material produced from plastic waste of low volume weight and approximately 25-50% raw material produced from plastic waste of high volume weight.

After the raw material is mixed, additives are added to the mixture in the mixer 7 with an electronic scales and mixing system; for example, colouring agents, UV protection substances, antioxidants, a foaming agent (e.g. EN3), mineral additives and additives that improve the structure of the material, glass fibres, textile fibres and/or mineral additives approximately in the range of 0.2%-10%. The additive mixer 7 allows for mixing different sizes and adding powdered additives and various colourings at the same time. The mixing takes place on the basis of the volume weight. From the additive mixer, the raw material mixture is taken to the extruder 9. Raw-material 'bridges' are prevented in the mixer and connecting tubes, because this would stop the material from moving.

Foaming is used to regulate the density of plastic products in the approximate range from 0.5-0.85 t/m$^3$. Changing the speed of the production process changes the density of the final products. At higher speeds, the processed plastic mix spends less time in the system of calibration matrices. Therefore, the foamed part of the products profile expands and the top layer of the product, through which gasses do not pass, becomes thinner. For example, by increasing the production speed by 20%, the density of the plastic products decreases by around 5%-7%. A different density also means different physical characteristics of the final product. For example, lower density incurs smaller weight and poorer flexural strength of the plastic product.

The foaming substance makes the product porous on the inside, and the product is weatherproof, tolerating well temperature fluctuation (from +65° C. to −30° C.). For example, the preferred density of the material used for terrace boards is preferably 0.75-0.85 t/m$^3$; that of non-bearing materials (e.g. partitions or façade materials) is preferably 0.5-0.6 t/m$^3$. By adding, for example, a 0.2% foaming agent, the tonnage of the raw material saved up to 20%.

The product according to the present invention can be nailed, milled and sawed well. By using 1%-4% a colouring agent that includes UV protection, the final product receives an aesthetic appearance. For example, 1%-10% glass or textile fibres added increase the flexural strength of the profile up to two times.

The additives added, the continuous extrusion foaming takes place in the extruder 9 in compliance with the temperature curve in FIG. 6. For that purpose, the whole mass of polymers is melted, and it goes through three procedural stages in the extruder 9: feed, compression and mixing (i.e. metering). To ensure stable movement, a temperature curve that is most suitable for the extrusion (see FIG. 6) is set. Whereas the temperature in each zone is set in compliance with the temperatures shown in FIG. 6, ±2%-5%. As the mass of molten plastic includes gases and is at around 3-6 bar in the extrusion head 29, the polymeric mass coming out of the extruder is 'living' and wants to expand, i.e. the volume of it increases around 20% within the first 1-3 seconds after exiting the extruder. The moulding of the plastic product begins in the extrusion head 29 and the die 30. Extruders are usually used for the extrusion or recycling of just one type of polymer. In the present process, the mixture of polymeric materials that has been made of nine different types of plastic waste goes through the extruder.

In the alternative embodiment of the invention, a co-extrusion process is used, where another extruder adds a thin layer of one type of polymer to the mixed plastic raw material. The co-extrusion process saves on colouring the whole plastic material, because only the thin top layer of a single type of polymeric material needs to be coloured. In the co-extrusion process, an additional extruder is used to melt a single type of polymeric material that is added to the molten plastic made from mixed plastic waste, immediately before it exits the extruder.

Figure 4:
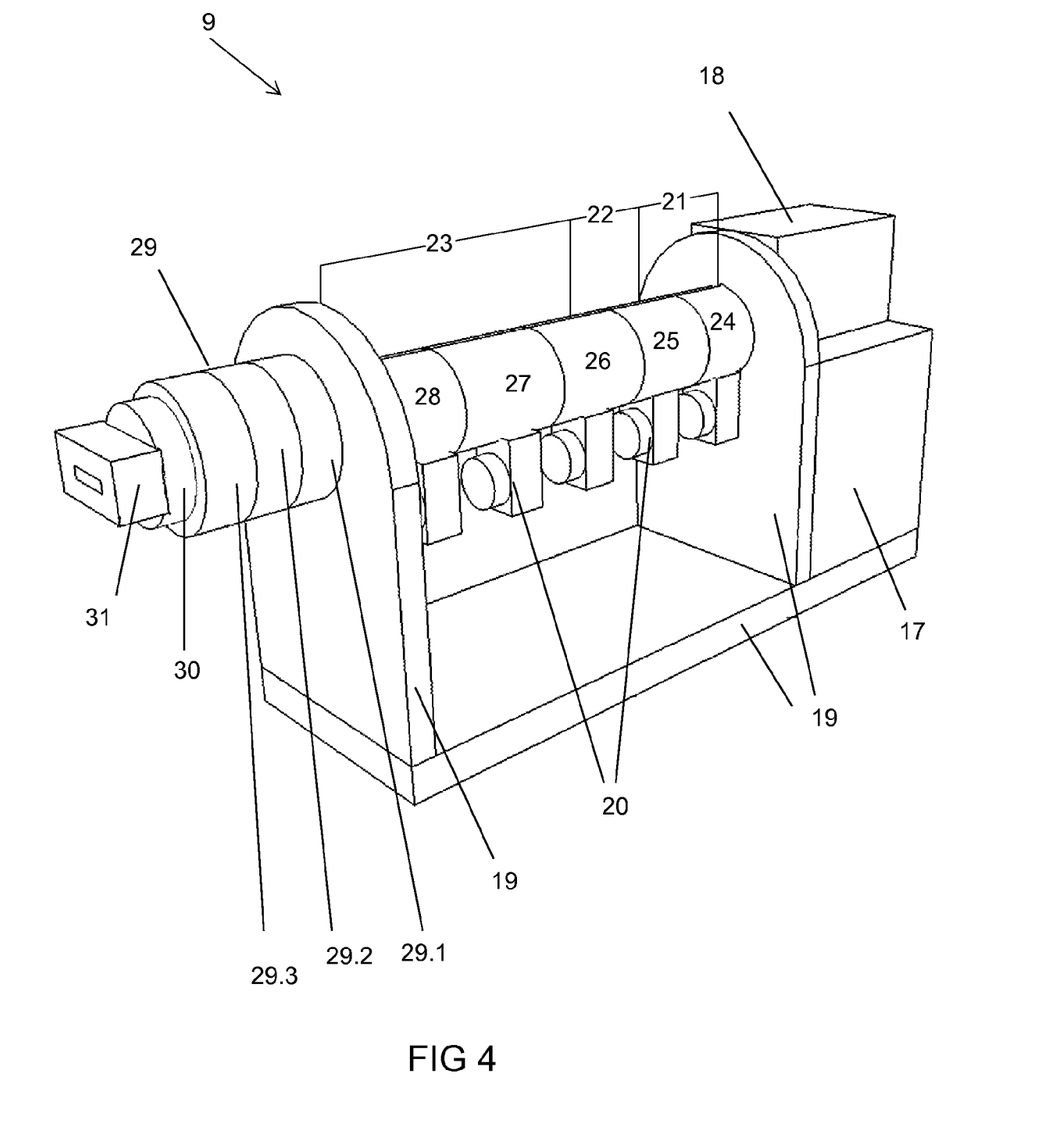
FIG. 4 is a diagram of the extruder depicted in FIGS. 2 and 3.

FIG. 4 depicts the extruder 9 of the invented system for producing plastic products from recycled mixed plastic waste. It is preferable to have a single-screw extruder that comprises a screw drive motor 17; a gear box 18 of the extruder; a frame 19; cooling ventilators 20; a screw of the extruder that comprising a feeding zone 21, a compression zone 22 and a mixing zone 23; a barrel comprising at least five heating zones 24-28; an extrusion head 29; a die 30; and a head extension 31 that is also used as the first cooling zone.

The material is heated in a single-screw extruder 9 that has at least five heating zones 24-28. The screw of the extruder 9 is designed to mix the material, not to transport it, i.e. the feeding zone 21 of the screw and the compression zone 22 together do not exceed half of the screw length. The mixing zone 23 has a small volume that does not exceed one-third of the volume of the feeding zone 21.

The temperature zones used in the extruder 9 are divided into three:
1) in the first zone 24-28, the barrel, the temperature is kept approximately in the range of 145° C.-180° C.;
2) in the second zone 29-30, the extrusion head, the temperature is kept approximately in the range of 180° C.-210° C.;
3) in the third zone 31, the extended head of the extruder, the temperature is kept approximately in the range of −3° C. and −8° C.

The extruder to be used is chosen on the basis of the cross-section of the final profile because a highly productive extruder is not suitable for making small profiles and vice versa. For example, extruders with a screw diameter 90-120 mm are suitable for making profiles that have a cross-section of 138-140 mm×30-32 mm; 138-140 mm×38-40 mm; 95×95 mm.

The control panel of the extruder shows readings of the zone temperatures, of the ammeter, the rotational speed of the screw, pressure sensors of the extrusion head and line speed (m/min). During the process, the temperature of the extruder motor and the cooling of the gear box is kept under control (max 70° C.).

The control panel is used to control the temperatures of the heating zones of the barrel in compliance with the graph shown in FIG. 6: zone 24—approximately 145-150° C.; zone 25—approximately 150-153° C.; zone 26—approximately 153-155° C.; zone 27—approximately 155-160° C.; zone 28—approximately 160-167° C. The temperatures in the heating zones of the extrusion head: zone 29—approximately 180-195° C.; zone 30—approximately 190-210° C.; and zone 31—between approximately −3° C. and −8° C. The control panel is also used for controlling the pressure in the extrusion head, which is kept approximately in the range of 3-6 bar; the temperature of the molten plastic exiting the extrusion head; the rotational speed of the extruder screw 36-48 rotations a minute; the amperage of the extruder 34-40 A; the profile moving speed on the production line 0.3-0.5 m/min; and the pulling strength of the pultrusion machine, which is 35-50% of the maximum capacity of the pultrusion machine. Zones 24-28 ensure the suitable melting of the polymeric mass and the generation of gasses. There is no friction caused by the rotation of the screw in zones 29-30; the temperature is maintained there, and the molten polymeric mass is kept under the pressure of approximately 3-6 bars there.

The temperature sensors that are controlled automatically ensure the stable functioning of the three extrusion stages, so that the polymeric mass exiting the extruder is homogenous and stable.

The screw 9 of the extruder is divided into three zones: the pieces of plastic that have not yet melted are fed onto the screw in the feeding zone 21 and along the compression zone 22; in the compression zone 22, the heaters and abrasion start the melting process; and the mixing zone 23 mixes and pressurises the molten plastic and transports it into the extrusion head 29.

As different types of plastic are mixed and melted, the resulting mass of molten plastic is unstable in the production process. To control it, the feeding zone 21 of the screw is as short as possible and the mixing zone is as long as possible, and the transition between the compression zone 22 and the mixing zone 23 is smooth. The feeding zone 21 and the compression zone 22 together do not exceed half of the length of the screw. The mixing zone 23 has a small volume that does not exceed one-third of the volume of the feeding zone 21.

Figure 5A:
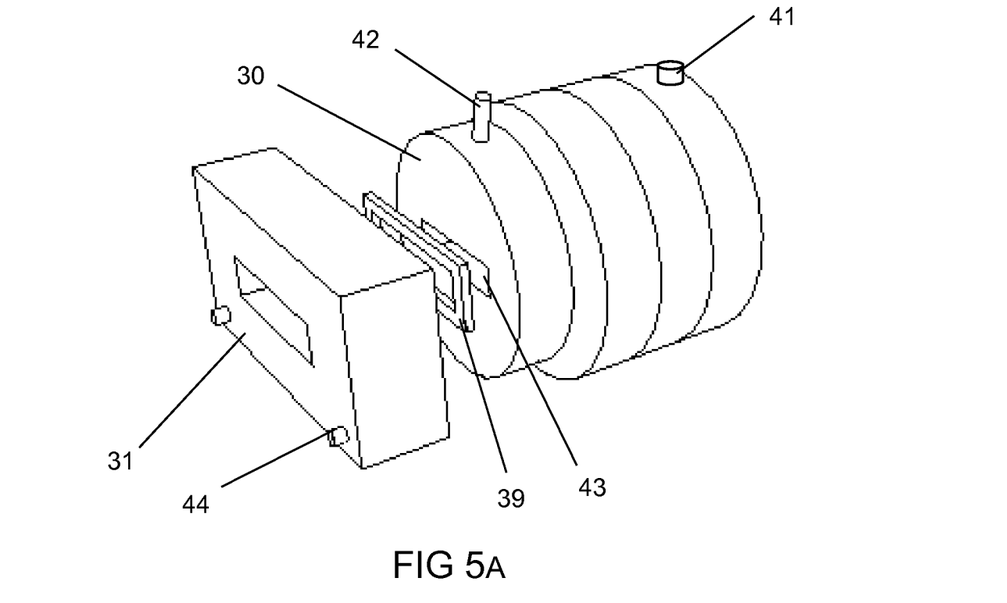
FIG. 5*a* is a side perspective of the extrusion head depicted in FIG. 4.
Figure 5B:
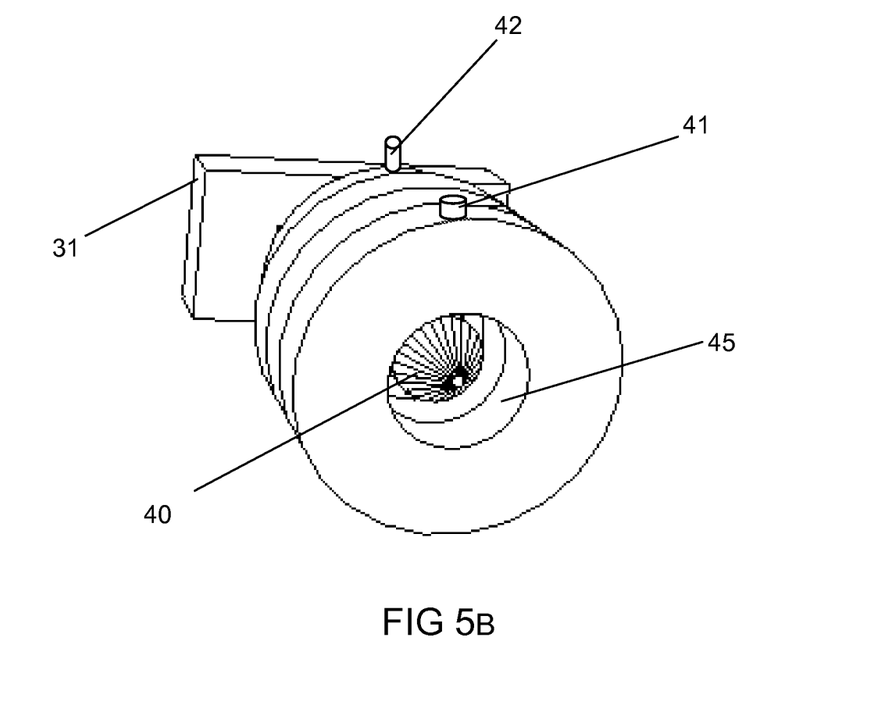
FIG. 5*b* is a perspective view of the extrusion head depicted in FIG. 4 from the barrel side.

The extrusion head 29 comprises three heating zones 29.1-29.3, a die 30, a head extension 31 and an isolation plate 39 attached to the die, a flow channel 45, a guide 40 in the centre of the extrusion head 29, a pressure sensor 41 before the guide; pressure and temperature sensors 42 after the guide, the outlet 43 for the molten mass; and a system of pins 44.

The die 30 of the extruder is the last part of the extrusion head 29, and it is designed to match the size and shape of the outlet and the ratio of the outlet and the inlet of the calibration matrix. The latter is preferably approximately 80% of the cross-section of the first calibration matrix 10.1. The guide 40 of the plastic flow is in the middle of the extrusion head 29 imitating the shape of the flow channel 45 of the extrusion head 29, and it is designed to guide the plastic flow to the edges of the plastic profile.

The extrusion head 29 comprises two pressure sensors 41 and 42, one of them before and the other after the flow guiding zone. The sensor on the side of the calibration matrix also measures, in addition to the pressure (3-6 bar), the temperature of the molten plastic exiting the extruder, which is approximately 168-178° C.

The extrusion head 29 comprises three heating zones 29.1-29.3. The head 29 is attached to the extruder in such a way that the outlet of the head 29, where the molten polymeric mass exits from, is parallel to the horizontal axis and crosswise to the vertical axis.

The extrusion head 29 comprises a die 30. The die is used to regulate and guide the exiting molten plastic into the calibration matrix. The inner shape of the die imitates the profile to be produced, i.e. their cross-sections are similar. An isolation plate 39 is attached to the die to reduce heat transfer from the die 30 (up to 200° C.) to the first section of the calibration matrix 10.1, which is approximately −5° C.

In the extrusion head 29, the molten plastic moves only due to the pressure generated by the screw.

The flow channel 45 of the extrusion head 29 gets smaller towards the end, thus creating counter-pressure to the screw. The counter-pressure ensures control over the unstable plastic flow. The pressure inside is controlled by the pressure sensors 41 and 42 attached to the head. The trends of the pressure are monitored, i.e. if the pressure in the extrusion head 29 increases, the speed of the pultrusion machine is increased and vice versa.

The outlet 43 of the die 30 has a cross-section similar to the profile to be produced. The extruder 9 ends with the head extension 31 attached to the die 30. Its temperature is below zero, and the first calibration matrix is attached to it. However, the temperature of the head 29 is up to +200° C.

The outlet 43 of the die 30 has an area of approximately 80-85% of the cross-section of the profile to be produced. At the moment when the molten mass exits the head 29 and enters the calibrator, the pressure drops from 3-6 bar to 0.5-1 bar within 1-2 seconds and to 0.1 bar within the following 10 seconds. The low temperature causes the first cold shock that contributes to the control of the process. The previously known solutions do not have a sub-zero calibration matrix attached to the extrusion head 29 that is up to +200° C.

After the molten mass of plastic exits the extruder 9, it is cooled down in two stages, where the first cools the calibration matrices 10 and the second, the water cooling bath 12. The cooler of the calibration matrices 10 keeps the temperature of the cooling agent at least −5° C. The cooling agent is preferably non-freezing. The couplings of the cooling hoses are quick-connect couplings for quick replacement of calibration matrices. All connection hoses are covered with thermal insulation material to avoid condensate formation and excessive energy losses.

The first cooling phase takes place in the cooling system of calibration matrices 10, where the profile is given a form, and active cooling makes the form permanent. The second phase of cooling takes place when the product is going through the water cooling bath 12.

After cooling, the profiles go to the pultrusion machine 13 that constantly measures pulling strength (approximately 35%-50% of the pulling capacity of the device) and pulling speed (approximately 0.3-0.5 m/min) of the product and automatically adjusts the extrusion speed. It pulls 'endless' profiles through the calibration matrices 10 and water cooling bath 12 up to the automatic saw 16. In contrast to an ordinary pultrusion machine, the solution according to the present invention includes measurement of the pulling strength of the device. The indicator is the basis for the automatic adjustment of the pulling speed, i.e. if the pulling strength increases 1%, the pulling speed is increased by 1% and vice versa. The changes in the pulling strength of the device reflect the friction between the surface of the product and the interior of the calibration matrices. In the final stage of the reprocessing, the automatic saw 16 cuts the profiles into products of suitable length.

Figure 7:
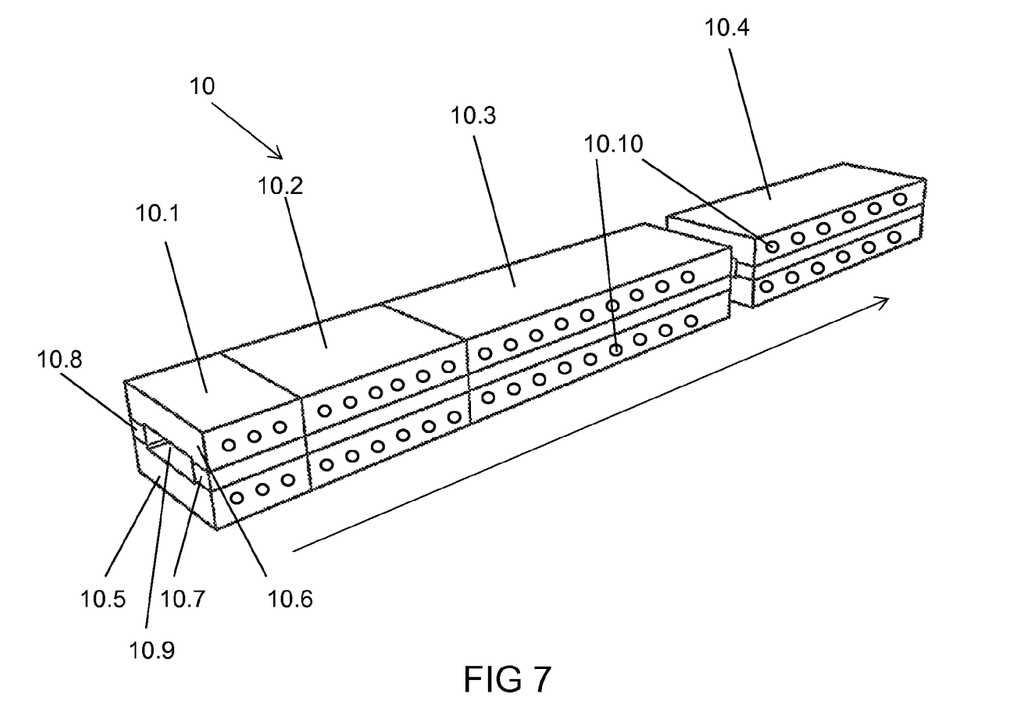
FIG. 7 depicts the system of calibration matrices depicted in FIGS. 2 and 3.

In one embodiment of the invention, the system of calibration matrices 10 (see FIG. 6) comprises a calibration matrix 10.1 that is connected to the extrusion head extension 31; calibration matrix 10.2, calibration matrix 10.3, calibration matrix 10.4, whereby each calibration matrix comprising a bottom 10.5, a lid 10.6 and sides 10.7 and 10.8 that are rigidly fixed to one another, thus forming an inner chamber 10.9 of the matrices that give the required shape to the plastic profile; and cooling channels 10.10. In the flow direction of the plastic mass from the first calibration matrix 10.1 to the last 10.4, the volume of the inner chamber 10.9 of the calibration matrices increases to reduce the pressure the expanding hot plastic exerts on the interior walls of the calibration matrices.

The system of calibration matrices 10 evenly decreases the pressure of the exiting material—each following matrix is 0.5 mm bigger than the previous one. The calibration matrices have been designed on the basis of the last 1000 mm matrix that is the size of the profile, i.e. final product.

The calibration matrices are rigidly joined (e.g. with bolts or pin systems) and preferably with an accuracy of 0.01.

The multi-component system of calibration matrices makes it possible to make different profiles, using the same components.

All calibration matrices are centred and level on the calibration table 11. The cooling channels of the calibration matrices are designed to allow control of cooling in the matrices by valves that adjust the volume of the cooling agent that flows through the whole system of matrices 10 or in its parts, thus making it possible to keep the first matrices in the system 10 colder than the last ones. When the pulling strength increases, the cooling is made more intensive by opening the valves in order to maintain the pulling strength of the pultrusion machine at 35%-50% of the maximum capacity, because more intensive cooling reduces friction of the product against the inner surface of the matrix.

A 120 mm calibration matrix is fixed to the extrusion head 29 as an extension of the extruder. The temperature of the head 29 is +200° C. and that of the first calibration matrix 10.1 is −5° C. Other calibration matrices are on a separate calibration table 11.

The table 11 is inflexible and provides adjustment opportunities in different parts. It also includes a locking system that allows for adjustment to be fixed onto the table 11. The calibration table 11 can be moved farther away from the extruder as it is on tracks.

If the calibration table 11 with the calibration matrices 10 is moved against the pin system fixed to the extrusion head 29, the table can be locked in this position to avoid it moving away from the extrusion head 29 due to the pressure exerted by the molten plastic coming out of the extruder.

The lids of the calibration matrices can be pressed shut and fixed at up to 12 tonnes. The possibility to open the matrices allows quick access to their inner chamber.

In ordinary matrix systems, such aggressive liquid-based cooling is not used, and the insides of each following matrix are not bigger than the ones of the previous one in order to reduce the pressure and friction affecting the inner surface of the matrices.

The cooling system of the water cooling bath 12 ensures effective cooling (up to +10° C.) of the cooling water required by the bath. The preferable length of the water cooling bath 12 is 8 meters, comprising a circulating water supply system. The water cooling bath 12 is designed to be used for making different profiles.

The pultrusion machine 13 pulls the extruded profile through the matrices, at the same time creating counter-pressure to the extruder. The counter-pressure forms the profile in the calibration matrices. The gear reducer of the pultrusion machine 13 allows for production at very low speeds, starting from 0.002 m/min. The transmission of the electric motor and reducer system is adjusted optimal for the line speed. The pulling strength applied to the profile by the process of the pultrusion machine 13 is measured. The aim of the pultrusion machine that constantly measures pulling strength and pulling speed and automatically adjusts the extrusion speed is to pull the 'endless' profile through the calibration matrices and water cooling bath up to the automatic saw. The task of the pultrusion machine is to pull the extruded profile through the system of calibration matrices 10, at the same time creating counter-pressure to the extruder 9. The counter-pressure forms the profile in the calibration matrices. The pulling strength applied to the profile by the process of the pultrusion machine is measured. In contrast to an ordinary pultrusion machine, the present technological process includes a measurement of the pulling strength of the machine. The indicator is the basis for the automatic adjustment of the pulling speed.

The automatic saw 16 cuts the profile to a pre-set length; it can be adjusted to various lengths. It is preferable to have a cage around the saw.

FIG. 7 depicts the cross-section of the sample plastic product made from recycled unidentified, unsorted mixed plastic waste using the system and method according to the present invention. The calibration matrices 10 have been used to give the plastic product a top-surface structure 32 with longitudinal furrows in it, a bottom-surface structure 33 and side-surface structures 34 and 35.

Depending on the statistical composition of polymers in the plastic waste of low and high density volume weight, the plastic product made according to the present invented system and method contains polymers, the composition of which in the realisation includes polystyrene and polypropylene approximately 5%-15%, PE/PP with a similar molecular formula approximately 50%-65% and unidentified types of polymers to the remaining extent. When melting into one, the molten mass of plastic with a similar molecular formula will dominate.

Figure 8:
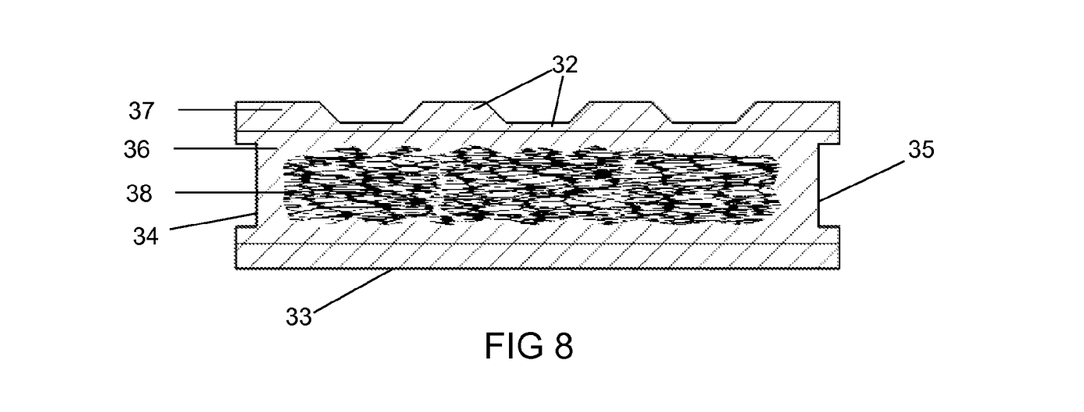
FIG. 8 depicts the cross-section of the sample product made using the system and method according to the present invention.

Hence, if a mixture made of plastic waste of high volume weight is added to the composition of plastic waste of low volume weight in the mixing system 3, the molten mass of plastic of a similar molecular formula will dominate in the product according to the alternative embodiment of the present invention. Depending on the need, additional additives can be added as substances providing better control of the production process, i.e. these are used to control the behaviour of the molten mass of plastic during the reprocessing of the composition. The tests have shown that polypropylene (PP) moves in the surface layers 36 of the mass melted during the reprocessing of the composition of mixed plastic waste, and it binds the mass of polymers that have a similar molecular formula from the plastic waste of high and low volume weight. When it touches the wall of the cooling mould, it gives the product a surface 37 that does not let gases through.

The tests have also shown that polystyrene (PS) moves in the middle layers 38 of the composition of mixed plastic waste. As the polystyrene (PS) cools down quicker than other plastics, and polystyrene (PS) is in the middle layers of the molten mass 38, the structure that is the result of cooling does not let the product cave in. Adequate mixing of polystyrene (PS) and other molten plastic in the molten raw material under pressure ensures homogeneity, durability and the porous insides of the product according to the present invention, its density being approximately 0.6-0.8 t/m$^3$.

When making a product according to the present invention from recycled mixed plastic waste, for example, by adding a foaming agent, the generation of gases is simulated in the molten plastic. When the mass is cooling down, the gases expand and look for a way out of the mass. Polypropylene moves in the surface layers 36 of the molten mass and binds a mass of a similar molecular formula. When it touches the cold walls of the calibration matrices, it forms a surface layer 37 that does not let the gases through. Polystyrene moves in the middle layers 38 of the molten mass. As polystyrene congeals faster than other mass and it is in the middle layers of the molten mass, the structure that is the result of cooling does not let the product cave in. At the same time, polystyrene and other mass is adequately mixed while in a molten state and under pressure. This ensures homogeneity and the porous insides of the product, its density being approximately 0.6-0.8 t/m$^3$.

To improve the quality of the product, polystyrene (PS) and/or polypropylene (PP) are/is added, in the mixing system 3, to the raw material made from a mix of mixed plastic waste that is unidentified, unclean and unsorted and has been recycled.

In an alternative embodiment of the invention, the plastic products produced according to the system and method of the present invention comprise, for example, matchboards, terrace boards and profiles with various cross-sections.

The characteristics of the final product made according to the system and method for producing products from raw material recycled from mixed plastic waste are as follows:
density: 0.6-0.8 t/m$^3$;
dense surface layer 37 of 5-20 mm and porous and foamed insides 38;
flexural properties (EN 408): 1843 N/mm$^2$ at −50° C.; 795 N/mm$^2$ at 22° C.; and 452 N/mm$^2$ at 60° C.;
linear expansion: 0.069 mm/m/° C. (indicates the product expansion per 1 m when the temperature raises 1 degree by Celsius);
flammability class: E (ISO 13501-1);
UV-impairment: ΔE=1.1 (no damage) (the UV tests were carried out under standard conditions (ASTM G154) over a period of time correlating to approximately 10 years of natural sunlight. ΔE indicates the change in colour-coordinates (L, a, b))
water absorption: 0.17% (ISO 62)
sound isolation: B3 (EN-1793-2)
resistance to with no damage from white spirits, lighter fluid, bleach or hot baking oil
non-toxic
resistant to a temperature fluctuation in the range between +65° C. and −30° C.;
linear expansion coefficient: 0.083-0.099α, mm/m·° C.;
surface hardness (ASTM D3363): 4H-5H;
load: 166-222 N;
nail holding strength (EVS-EN 13446:2002): 1328-1776 N
compressive force: 34.1-43.6 kN.

To provide further explication to the invention, the test data of the sample product made using the system and method according to the present invention is given below.

To test flexural properties and dependence on temperature, 690 mm and 810 mm long products were used. The test measured flexural strength, i.e. the bending power required to break the material at a certain temperature. Three repeat tests were used to calculate the average flexural strength (N/mm$^2$). Flexural modulus of elasticity, i.e. the ability of the material to deform flexibly, was also tested. The bending tests were conducted on the Instron 5866 load frame. In the test, the test products were placed into a solid-CO2 cooling chamber (−50° C.) for 24 hours and into a hot-air oven (60° C.) also for 24 hours; 22° C. was achieved by keeping the products at room temperature. After the required temperature was reached, the products were placed into a four-point bending setup and a load was applied. The bending test was conducted at the load speed of 5 mm/min; the test ended upon breaking of the test product.

The numerical test results, average values and standard deviations for the 690-mm long product with the cross-section of 138×32 mm.

|  | Maximum flexural power N | Global modulus of elasticity N/mm$^2$ | Flexural strength N/mm$^2$ |
|---|---|---|---|
| −50° C. | | | |
| 1 | 2762.63 | 1214.32 | 11.34 |
| 2 | 3637.21 | 1755.92 | 14.93 |
| 3 | 5397.96 | 2559.40 | 22.16 |
| AVG | 3932.60 | 1843.21 | 16.14 |
| STD | 1342.27 | 676.78 | 5.51 |
| −22° C. | | | |
| 1 | 2468.28 | 703.44 | 10.13 |
| 2 | 2678.05 | 730.68 | 11.00 |
| 3 | 3030.06 | 952.69 | 12.44 |
| AVG | 2725.46 | 795.60 | 11.19 |
| STD | 283.88 | 136.72 | 1.17 |
| −60° C. | | | |
| 1 | 1539.32 | 503.18 | 6.32 |
| 2 | 1686.14 | 484.33 | 6.92 |

-continued

| | Maximum flexural power N | Global modulus of elasticity N/mm² | Flexural strength N/mm² |
|---|---|---|---|
| 3 | 1612.00 | 368.99 | 6.62 |
| AVG | 1612.49 | 452.17 | 6.62 |
| STD | 73.41 | 72.65 | 0.30 |

The numerical test results, average values and standard deviations for the 810 mm long product with the cross-section of 138×38 mm.

| | Maximum flexural power N | Global modulus of elasticity N/mm² | Flexural strength N/mm² |
|---|---|---|---|
| | −50° C. | | |
| 1 | 4911.98 | 1489.91 | 17.11 |
| 2 | 5318.24 | 1804.36 | 18.52 |
| 3 | 5816.00 | 2002.50 | 20.26 |
| AVG | 5348.74 | 1765.59 | 18.63 |
| STD | 452.78 | 258.48 | 1.58 |
| | −22° C. | | |
| 1 | 2902.80 | 586.37 | 10.11 |
| 2 | 2893.29 | 583.78 | 10.08 |
| 3 | 2891.01 | 539.08 | 10.07 |
| AVG | 2895.70 | 569.74 | 10.09 |
| STD | 6.25 | 26.59 | 0.02 |
| | −60° C. | | |
| 1 | 1945.10 | 293.62 | 6.77 |
| 2 | 2568.48 | 454.08 | 8.95 |
| 3 | 2117.59 | 237.36 | 7.38 |
| AVG | 2210.39 | 328.35 | 7.70 |
| STD | 321.88 | 112.46 | 1.12 |

The temperature-related change in the dimensions of the material was tested by measuring the linear expansion coefficient. The test was conducted at four different temperatures: −21.3° C.; 5.6° C.; 22.9° C.; 40° C.; and 60° C. The testing devices used were a Sony U30F thickness meter, a freezer (−21.3° C.), a refrigerator (5.6° C.) and a hot-air oven (40° C. and 60° C.). The test products were 100 mm long. They were kept at the chosen temperatures for 24 hours and their length was measured immediately after that time. 138×32 mm product. Relative length at the given temperature (mm).

| | −21.3° C. | 5.6° C. | 22.9° C. | 40.0° C. | 60.0° C. |
|---|---|---|---|---|---|
| 1 | 9.601 | 9.845 | 9.993 | 10.143 | 10.261 |
| 2 | 9.775 | 9.976 | 10.138 | 10.301 | 10.402 |
| 3 | 10.846 | 11.069 | 11.24 | 11.43 | 11.528 |
| AVG | 10.074 | 10.297 | 10.457 | 10.625 | 10.730 |
| STD | 0.674 | 0.672 | 0.682 | 0.702 | 0.694 |

138×38 mm product. Relative length at the given temperature (mm).

| | −21.3° C. | 5.6° C. | 22.9° C. | 40.0° C. | 60.0° C. |
|---|---|---|---|---|---|
| 1 | 10.869 | 11.117 | 11.3 | 11.495 | 11.662 |
| 2 | 9.603 | 9.825 | 10.012 | 10.2 | 10.426 |
| 3 | 9.782 | 10.032 | 10.202 | 10.395 | 10.533 |
| AVG | 10.085 | 10.325 | 10.505 | 10.697 | 10.874 |
| STD | 0.685 | 0.694 | 0.695 | 0.698 | 0.685 |

Linear Expansion Coefficient

| | α, mm/m · ° C. |
|---|---|
| 138 × 32 mm | 0.099 |
| 138 × 38 mm | 0.083 |

Surface hardness was determined using the method according to which the test result is the hardness of the pencil that does not penetrate the surface or leave a scratch on the surface. The method uses pencils of various hardnesses. Their hardness scale is as follows:

9H 8H 7H 6H 5H 4H 3H 2H H F HB B 2B 3B 4B 5B 6B 7B 8B

The hardest      Average      The softest The surface hardness of the product is 4H-5H.

To test the maximum load (N) and holding strength (N), a nail was used to find out what is the maximum power that needs to be applied to pull a nail out of the material. The nail was pushed in and pulled out using the R-5 (P-5) pulling machine with a pulling speed of 5 mm/min and pushing speed 20 mm/min. A steel construction nail of 3×80 mm was inserted into the whole thickness of the material, i.e. the insertion depth was 24 mm, which was the thickness of the test products. Then, the nail was pulled out of the product, and the maximum power applied during pulling was identified.

| | Maximum load (N) | Holding strength (N) |
|---|---|---|
| 1 | 200 | 1600 |
| 2 | 202 | 1616 |
| 3 | 190 | 1520 |
| 4 | 222 | 1776 |
| 5 | 218 | 1744 |
| 6 | 202 | 1616 |
| 7 | 236 | 1888 |
| 8 | 166 | 1328 |
| 9 | 216 | 1728 |
| 10 | 208 | 1664 |
| AVG | 206.0 | 1648.0 |
| STD | 19.2 | 153.8 |

The test on the maximum compressive force (kN) and the elongation (mm) upon the maximum compressive force was conducted on the Instron 8802 fatigue testing system at a compression speed of 10 mm/min. Edges sawn from non-foamed parts of another profile were placed on both sides of the product for support. The test product was placed between the load cells and force was applied to it until it broke. All test products broke beginning by widening at the middle, in a tubular shape, i.e. first, the centre of the material lost resistance, and right after that the compressive strength also decreased. The characteristics and dimensions (cross-sections differing up to 2 mm) of the test products were rather varying. The foamed part was always the one that broke.

| | Maximum compressive force (kN) | Elongation at maximum compressive force (mm) |
|---|---|---|
| 1 | 38.8 | 7.3 |
| 2 | 34.1 | 5.4 |
| 3 | 35.4 | 5.9 |
| 4 | 36.3 | 7.1 |

-continued

|  | Maximum compressive force (kN) | Elongation at maximum compressive force (mm) |
|---|---|---|
| 5 | 35.9 | 7.0 |
| 6 | 34.9 | 6.4 |
| 7 | 38.5 | 5.3 |
| 8 | 42.5 | 6.1 |
| 9 | 32.3 | 4.4 |
| 10 | 43.6 | 6.5 |
| 11 | 36.7 | 5.3 |
| AVG | 37.2 | 6.1 |
| STD | 3.4 | 0.9 |

What is claimed is:

1. A system for producing plastic products from recycled mixed plastic waste comprising:
a system for mixing raw materials, a first conveyor, a hopper, a second conveyor, a fine mixer with a weighing system, a control panel, an extruder, a system of calibration matrices on a calibration table, a water-cooling bath, a pultrusion machine with a converter, and an electric motor with a reducer, and an automatic cutter, wherein:
the extruder comprises a motor; a gearbox; a frame; cooling ventilators; a screw that has a feeding zone, a compression zone, and a mixing zone; a barrel that includes multiple heating zones; an extrusion head; a die; and a head extension that is also used as the first cooling zone;
the system of calibration matrices comprising a first calibration matrix that is connected to the extrusion head extension; a second calibration matrix, third calibration matrix, a fourth calibration matrix, each of the calibration matrices comprising a bottom, a lid and two sides and each calibration matrix being rigidly fixed to one another, thus forming an inner chamber of the matrices; and cooling channels; and
the pultrusion machine constantly measuring pulling strength and pulling speed and adjusting extrusion speed automatically.

2. The system according to claim 1, wherein the feeding zone and the compression zone of the extruder together do not exceed a half of the screw's length and the volume of the mixing zone does not exceed one-third of the volume of the feeding zone.

3. The system according to claim 1, wherein the extruder has three temperature zones:
in the first zone, being the barrel, the temperature is kept at approximately 145° C.-180° C.;
in the second zone, being the extrusion head, the temperature is kept at approximately 180° C.-210° C.; and
in the third zone, being the head extension, the temperature is kept approximately −3° C. and −8° C.

4. The system according to claim 1, wherein the extrusion head comprises three heating zones, the die, the head extension, an isolation plate attached to the die, a flow channel, a guide in the centre of the extrusion head, a pressure sensor, a pressure and temperature sensor, and an outlet for the molten mass.

5. The system according to claim 4, wherein:
the outlet of the extruder head is parallel to the horizontal axis and crosswise to the vertical axis;
the flow channel of the extrusion head is reduced towards the end;
the first calibration matrix is attached to the extrusion head; and
the outlet of the extrusion head has an area of approximately 80-85% of the cross-section of the profile to be produced.

6. The system according to claim 1, wherein the extrusion die has a cross-section approximately 80% of cross-section of the first calibration matrix.

7. The system according to claim 1, wherein the volume of the inner chamber of the calibration matrices increases from the first calibration matrix to the last one.

8. A method for producing plastic products from recycled mixed plastic waste with the system of claim 3, wherein the method comprises the steps of:
a mixture of raw material is made of recycled mixed plastic waste;
additives are added; the mixture is mixed; the mixture is extruded;
the extruded mixture is cooled down;
a pultrusion process is performed; the plastic products are automatically cut to size, wherein:
after mixing the raw materials, the first conveyor of the system takes the mixed plastic waste to the hopper, and the second conveyor of the system takes these to the fine mixer with the weighing system;
in the fine mixer, additives either recycled mixed plastic waste and/or granulated plastic waste of one type are added to the mixture;
from the fine mixer, the mixed and grinded mixture of mixed plastic waste and additives go to the extruder, where continuous extrusion foaming takes place in controlled temperatures according to a predetermined temperature curve, the temperature being controlled in the zones of the extruder;
after the extrusion process, the plastic mass made from the mechanically and thermally processed mixed plastic waste and additives goes to the system of calibration matrices that is connected to the extruder;
this is followed by a two-phase cooling in the system of calibration matrices and the water cooling bath;
after cooling, the material goes to the pultrusion machine that constantly measures pulling strength and pulling speed and automatically adjusts the extrusion speed, and then to the automatic cutter that cuts the products to size.

9. The method according to claim 8, wherein the additives that are added include coloring agents, UV protection substances, antioxidants, a foaming agent, mineral additives and additives that improve the structure of the material, glass fibres, textile fibres and/or mineral additives approximately in the range of 0.2%-10% or polystyrene (PS) and/or polypropylene (PP).

10. The method according to claim 8, wherein in the feeding zone of the extruder, the pieces of plastic that have not yet melted are taken to and down the screw to the compression zone, where the plastic is melted; in the mixing zone the plastic is mixed, pressurised and taken down the screw to the extrusion head; the mixing takes place in the first temperature zone that ensures the suitable melting speed of the polymeric mass and generation of gases; and the second temperature zone keeps the temperature maintained and keep the molten polymeric mass under the pressure of approximately 3-6 bar.

11. The method according to claim 8, wherein the volume of the mass coming out of the extruder increases approximately 20% within the 1-3 seconds after exiting the extruder.

12. The method according to claim 8, wherein a cold shock is used to control the process.

13. The method according to claim 8, wherein the first half of the system of calibration matrices is kept cooler than the second half.

14. The method according to claim 8, wherein the pultrusion machine pulls the extruded profile through the system of calibration matrices, at the same time creating constant counter-pressure to the extruder.

15. The method according to claim 8, wherein a co-extrusion process is used, where another extruder adds a thin layer of one type of polymer to the raw material of mixed plastic waste.

* * * * *